United States Patent [19]

Sato

[11] Patent Number: 4,587,277

[45] Date of Patent: May 6, 1986

[54] RADIATION SHIELD

[75] Inventor: Shinobu Sato, Matsudo, Japan

[73] Assignee: Yukiyasu Unno, Japan

[21] Appl. No.: 553,622

[22] Filed: Nov. 21, 1983

[30] Foreign Application Priority Data

Apr. 4, 1983 [JP] Japan ................... 58-57955

[51] Int. Cl.$^4$ .......................... C08K 3/22; G21F 1/10; G21F 1/08; G21F 3/04
[52] U.S. Cl. ................... 523/136; 252/478; 376/288; 428/290; 523/400; 523/442; 523/459; 524/430; 524/597; 250/505.1; 250/515.1; 250/517.1; 250/518.1
[58] Field of Search ............... 523/136, 400, 442, 459; 524/430, 597; 428/290; 252/478; 376/288; 250/505.1, 515.1, 517.1, 518.1

[56] References Cited

U.S. PATENT DOCUMENTS

| | | | |
|---|---|---|---|
| 2,063,329 | 12/1936 | Morrison | 376/288 |
| 2,845,660 | 8/1958 | Peiler | 376/288 |
| 3,075,925 | 1/1963 | Dunegan | 376/288 |
| 3,114,839 | 12/1963 | Peters | 250/518.1 |
| 3,230,375 | 1/1966 | Van Wagoner et al. | 252/478 |
| 3,247,130 | 4/1966 | Isbell | 252/478 |
| 3,609,372 | 9/1971 | Vogel | 250/518.1 |
| 3,827,982 | 8/1974 | Hall et al. | 252/478 |
| 3,962,511 | 6/1976 | Foti | 428/290 |
| 4,437,013 | 3/1984 | Hondorp | 250/518.1 |

FOREIGN PATENT DOCUMENTS

| | | | |
|---|---|---|---|
| 1801578 | 6/1971 | Fed. Rep. of Germany | 252/478 |
| 2509944 | 9/1976 | Fed. Rep. of Germany | 523/136 |
| 2482761 | 11/1981 | France | 252/478 |
| 53-40197 | 4/1978 | Japan | 250/515.1 |
| 55-119099 | 9/1980 | Japan | 250/518.1 |

*Primary Examiner*—Ronald W. Griffin
*Attorney, Agent, or Firm*—Allegretti, Newitt, Witcoff & McAndrews, Ltd.

[57] ABSTRACT

A radiation shield superior to lead in absorbing/attenuating X-rays and the like made by molding with a resin binder a mixture of powders, namely lead oxide derived from scrap storage batteries, slag derived from electrorefining of aluminum, nickel or chromium as a by-product, and molybdenite. The molded shield may also contain zeolite for gas absorption and a reinforcing core of glass fabric.

8 Claims, No Drawings

RADIATION SHIELD

The present invention relates to a radiation shield with an improved radiation absorption/attenuation characteristic resulting from the employment of lead oxide.

Prior Art

It is well known that, in medical and industrial facilities such as irradiation chambers and X-ray and infrared-ray radiographing chambers of hospitals, radiation-related research institutes, nuclear power plants, nuclear-powered ships, etc., care must be taken to protect engineers and other personnel engaged in radiation-related work, as well as researchers, against radiation hazards by ensuring that, for instance, the ceiling walls of radiation-operating chambers or the like, the cooling-water circulating systems, or the radioactive waste containers in nuclear power plants are shielded by concrete structures containing lead plates or lead granules.

However, such lead shield plates, though displaying good radiation absorption, are deficient in that radiation which remains unabsorbed scatters behind them. Further, apart from this deficiency, the processing of said lead plates requires considerable time and labor; and in general, lead shield plates are very heavy due to the high specific gravity of lead, and thus very inconvenient and difficult to install and transport.

There are known lead shield plates of the type in production which, for the purpose of elimination of the above deficiency, lead powder is mixed into a latex, and the resulting mixture is then vulcanized; and further, the type in which a mixture consisting of synthetic-resin powder and lead powder is rolled under heating into a plate. Such lead shield plates involve the disadvantage that a heating step is required in the manufacturing process, and further, in the case of employment of a latex, there is the danger of premature vulcanization.

There is also known a radiation shield plate formed in such manner that lead powder is bound, by absorption, to an asbestos fiber material, which is then added to a cement slurry for molding thereof. (Reference is made to Japanese Patent Publication No. 24,448/78). However, such radiation shield plate, which is formed by the process also applied to paper-making, is of restricted thickness and, moreover, requires a long curing period of several months; and, above all, a serious drawback is that the mechanical strength of the final product is not sufficient and satisfactory.

THE INVENTION

It is the object of the present invention to provide a radiation shield plate comprising the lead oxide which is free from the above-mentioned defects of the known radiation shield plates and, in addition, lighter, and therefore easier to handle and install than the conventional radiation shield plastes, and which further has an excellent radiation absorption attenuation characteristic.

The radiation shield plate according to the present invention, which consists of a composition of predominantly lead-oxide powder and in addition molybdenum ore powder and a powder of slag generated in the electrorefining of aluminium or nickel or in the electric steel-making process, the above material mixture being press-molded, in the presence of a binder resin, with an inserted inorganic fiber core material, and then sintered.

The lead-oxide shield plate according to the present invention exhibits excellent properties in respect of radiation absorption/attenuation to such extent that it can be termed an astonishing technical break-through, particularly in view of the fact that it is known (reference is made to Japanese Patent Publication No. 24,599/78) that a radiation shield plate made from a lead-compound powder, such as, e.g., a lead titanate powder, in place of pure lead powder, as main material exhibits a radiation shielding property as low as about 1/5 of that of a shield plate made from pure lead powder as main material.

Slag derived from the electro-refining of aluminium has, depending on the source and on the kind of bauxite ore used, e.g., a composition according to one of the following examples:

| Density g/cm$^3$) | $Al_2O_3$ | $SiO_2$ | $TiO_2$ | $Fe_2O_3$ | $Na_2O$ |
|---|---|---|---|---|---|
| (a) (3.96) | 99.84 | 0.03 | traces | 0.01 | 0.13 |
| (b) (3.98) | 96.2 | 0.84 | 2.50 | 0.16 | — |
| | | | | | (weight %) |

Slag derived from the electro-refining of nickel or chromium, such as usable in the present context, may e.g., have the following composition:

| Ni—Slag Density g/cm$^3$) | Ni(total) | $H_4(Ni)SiO_5$ | $SiO_2$ | $Fe_2O_3$ |
|---|---|---|---|---|
| (8.90) | 96.2 | 2.50 | 0.84 | 0.16 |
| | | | | (weight %) |

| Cr—Slag Density g/cm$^3$) | Cr(total) | $FeCr_2O_4$ | $SiO_2$ | $Fe_2O_4$ |
|---|---|---|---|---|
| (6.92) | 96.2 | 3.05 | 0.64 | 0.11 |
| | | | | (weight %) |

The molybdenum ore powder used as one material component in the radiation shield plate according to the present invention is preferably 300 to 900 mesh in particle size, while the slag powder has a particle size of 30 to 70 mesh.

The binder resin used according to the present invention is a thermosetting resin such as melamine or epoxy resin. As the inorganic fiber core material, a carbon fiber core material or the like can be used, but an alkali glass fiber cloth is preferable.

The sintering of the press-molded material is performed at a temperature of 180° C. to 200° C. so as to increase the hardness of the molded material.

According to a modification of the present invention, a zeolite ore powder is additionally incorporated with the material of the radiation shield plate. The thus formed radiation shield plate is preferable for use, due to the gas absorption capability of the zeolite component, particularly as interior wall, ceiling or the like of a radiation-operation chamber in which the operation is accompanied by the generation of a radioactive gas.

The lead oxides employed for the present plates need not be chemically pure but can be the waste lead oxides from used batteries and other industrial by-products.

The molybdenum component of the molybdenum ore powder used for the present plates is assumed not only to exhibit a radiation shielding effect, but also to function as a binding and fixing component in respect of flourine produced in nuclear reactors.

The radiation shield plate according to the present invention is manufactured as follows: 30 to 60 parts by weight of lead-oxide powder (usually waste lead-oxide from batteries, as obtainable from Higashi Nippon Hitetsu Kinzoku Seiren Kako Kumiai (East Japan Nonferrous Metal Refining/Working Association), 5 to 15 parts by weight of a molybdenum ore (molybdenite from the mine at Muramatsu Town, Naka-Kanbara District, Niigate Prefecture, Japan, or the Climax Mine, Colo., U.S.A.), crushed by a crusher into a powder of approximately the same particle size (300 to 900 mesh) as the lead-oxide powder, 10 to 30 parts by weight of slag from the electro-refining of aluminum (obtainable from Showa Denka Co., Ltd.) and 10 to 30 parts by weight of zeolite ore (from the mine in Kyongju, South Korea), which (slag and zeolite ore) are both crushed by a crusher into a powder of a particle size (30 to 70 mesh) about ten times as large as that of the lead-oxide powder, are mixed together, and thereafter, 5 parts by weight of a binder resin (a pasty epoxy resin, manufactured by Dainippon Ink and Chemicals, Inc.) is mixed into the thus obtained mixture; the resulting mixture is put into a grindstone-manufacturing press; and, in order to impart flexibility to the final product, a commercially available glass fiber cloth (with a fiber diameter of 1 mm and a mesh width of about 3 mm to 4 mm) is suitably inserted into the material mixture and thus press-molded at a pressure of 150 atm to 200 atm into a plate of desired thickness. The thus molded product is sintered by subjecting it to heat treatment in an oven at a temperature of 180° C. to 200° C. for 10 to 24 hours for increase of the hardness of the product.

SPECIFIC EXAMPLES

The radiation shield plates according to certain examples of the present invention have compositions as shown in the following table:

TABLE 1

| Example No. | % by weight | | |
|---|---|---|---|
| | 1 | 2 | 3 |
| lead oxide powder | 30 | 50 | 60 |
| molybdenum ore powder | 5 | 10 | 13 |
| zeolite ore powder | 30 | 10 | 10 |
| slag powder from aluminum refining | 28 | 23 | 10 |
| binder resin | 5 | 5 | 5 |
| glass fiber and other components | 2 | 2 | 2 |

In order to examine the radiation shield effect of the radiation shield plates having the above-mentioned compositions, test pieces having an area of 100 mm × 50 mm were cut from sintered plates of 10 mm and 30 mm thickness; then, the test pieces thus cut out were each placed in a 250-watt X-ray irradiation apparatus, (manufactured by Nippon Roentgen Co., Ltd.), with an X-ray-sensitive film disposed thereunder, and the respective test pieces were subjected or exposed to X-ray radiation for one hour at a distance of 30 cm from the X-ray source. As a result, from the sensitivity exhibited by said X-ray-sensitive film, the X-ray attenuation factors as shown in the following table were confirmed:

TABLE 2

| Tested Objects: | | Ex. 1 | Ex. 2 | Ex. 3 |
|---|---|---|---|---|
| Thickness of Tested Objects | 10 mm | 50% | 97% | 86% |
| | 30 mm | 69% | 100% | 90% |

Wherein the percentage is based upon the total quantity of radiation striking the surface of each test piece.

Although in the above examples glass fiber cloths were used as reinforcing material, carbon fibers, etc., can be used instead.

The radiation shielding effect, due to the radiation absorption and attenuation, in the lead-oxide shield plates according to the present invention is markedly higher than the radiation shielding effect exhibited by a lead plate (1.5 mm in thickness) conventionally used for this purpose.

In order to examine the radiation attenuation effect of the lead-oxide radiation shield plates according to the present invention, the transmitted X-ray dose thereof was measured in accordance with JIS (Japan Industrial Standard) Z 4501 "Lead equivalent testing method for protective materials used against X-ray radiation hazards", leading to lead equivalents as follows:

Test Conditions

X-ray apparatus:
  Tyne MG 151, manufactured by Philips (N.V. Philips' Gloeilampenfabrieken). (smoothing circuit, focus size: 3.0 mm, Be window).
  Macrotank Type H, manufactured by Mueller (Self-rectifying circuit, focus size: 2.3 mm)
X-ray tube voltage and tube current:
  120 kV and 5 mA or 10 mA
  Additional filter plate comprising an aluminum plate of 2.5 mm thickness.
Distance between the focal point of the X-ray tube and the sample: 100 cm
Distance between the sample and the center of the measuring instrument: 20 cm
Measuring instrument:
  Ionization chamber exposure dose rate meter Radcon II, 555-IMA probe, manufactured by Victorian Corp; NDR 13101, manufactured by Fuji Denki Seizo Co., Ltd.
An X-ray shielding box was used.
Tested objects:
  Radiation shield plates of 10 mm thickness according to Example 2 of the present invention.

Test Results

Single plate: 0.78 mmPb (lead equivalent)
Two plates placed one over the other: 1.72 mmPb (lead equivalent)

The above lead equivalent values were found by plotting the measured transmitted X-ray dose rates on a chart in which the y-axis was used to represent the transmitted X-ray dose rate (mR/min), while the x-axis was used to indicate the lead equivalent (mmPb).

Further, in the above tests, it was surprisingly observed that, after the X-ray apparatus was switched off, the pointer in the ionization chamber dosimeter vibrated and moved unsteadily, indicating a lower value after a few minutes. Conversely, in case of a conventional lead shield plate, the value indicated by the pointer of the ionization chamber dosimeter remained nearly unchanged. This is because, in case of a lead plate, the radiation is reflected, whereas in case of a shield plate according to the present invention, it is assumed that, since said shield plate has a radiation attenuating effect, rapid attenuation of residual radiation occurs in the dosimeter.

Besides, referring to the above examples of the present invention, the radiation absorption effect of the shield plates is not affected even if no zeolite ore powder is incorporated; however, in case it is desirable to obtain a gas absorption or deodorizing effect, zeolite ore powder should be mixed in to a suitable degree.

Further, the radiation shield plate according to the present invention can also be used, if required, in such manner that one of the major or main surfaces thereof is covered with a thin lead plate, or that said radiation shield plate is disposed sandwiched between such lead plates.

The radiation shield plate according to the present invention exhibits excellent radiation shielding effect as has been disclosed, and yet the manufacturing costs are rather low due to the fact that the components or materials are ores and industrial by-products or wastes; and further, in view of the fact that such industrial by-products and wastes, the disposal of which is a serious problem awaiting solution, are being put to an economical use, the present invention is considered to contribute considerably to industrial advancement.

I claim:

1. A molded radiation shield comprising a thermosetting resin-bonded mixture of powders having the following composition
   30 to 60% lead oxide,
   10 to 30% slag derived from the electro-refining of aluminum,
   5 to 15% of molybdenite, said percentages being by weight based upon the total weight of the composition, and
   sufficient resin to bind the powders together to form said shield.

2. The shield of claim 1 in which said shield has a reinforcing core of inorganic textile material.

3. The shield of claim 2 in which said inorganic textile material is alkali glass.

4. The shield of claim 1 which also includes from 10 to 30% zeolite as part of the powder mixture.

5. The shield of claim 1 in which said lead oxide is present in quantity of about 50%, said aluminum slag is present in a quantity of about 23%, and said molybdenite is present in quantity of about 10%, and said resin is present in a quantity of about 5%.

6. The shield of claim 1 wherein said lead oxide and said molybdenite powders have a particular size of 300 to 900 mesh, and said slag powder has a particulate size of 30 to 70 mesh.

7. The shield of claim 1 wherein the resin binder is a melamine or epoxy thermosetting resin.

8. The shield of claim 1 in which said lead oxide powder is waste from storage batteries.

* * * * *